United States Patent
Smith et al.

(10) Patent No.: US 10,302,065 B2
(45) Date of Patent: May 28, 2019

(54) REINFORCING STRIP FOR A WIND TURBINE BLADE

(71) Applicant: Vestas Wind Systems A/S, Aarhus N. (DK)

(72) Inventors: Jonathan Smith, Hampshire (GB); Adrian Gill, East Cowes (GB); Mark Hancock, Southampton (GB)

(73) Assignee: Vestas Wind Systems A/S, Aarhus N. (DK)

(*) Notice: Subject to any disclaimer, the term of this patent is extended or adjusted under 35 U.S.C. 154(b) by 435 days.

(21) Appl. No.: 15/036,897

(22) PCT Filed: Nov. 14, 2014

(86) PCT No.: PCT/DK2014/050385
§ 371 (c)(1),
(2) Date: May 16, 2016

(87) PCT Pub. No.: WO2015/070876
PCT Pub. Date: May 21, 2015

(65) Prior Publication Data
US 2016/0273516 A1    Sep. 22, 2016

(30) Foreign Application Priority Data

Nov. 15, 2013    (GB) .................... 1320166.0

(51) Int. Cl.
*B29C 67/00*    (2017.01)
*B29C 70/52*    (2006.01)
(Continued)

(52) U.S. Cl.
CPC .......... *F03D 1/0675* (2013.01); *B29C 70/521* (2013.01); *B29C 70/526* (2013.01);
(Continued)

(58) Field of Classification Search
CPC ....... F03D 1/0675; F03D 13/10; B29C 70/34; B29C 70/342; B29C 70/52; B29C 70/521;
(Continued)

(56) References Cited

U.S. PATENT DOCUMENTS

2010/0314028 A1* 12/2010 Hedges ................. B29C 70/083
156/93
2014/0003956 A1* 1/2014 Lull ....................... B29C 70/865
416/230

FOREIGN PATENT DOCUMENTS

EP    2217748 A1    8/2010
EP    2497945 A1    9/2012
(Continued)

OTHER PUBLICATIONS

Mohammed H. Hassan, Visual Inspection of products with geometrical quality characteristics of known tolerances, Nov. 5, 2010, Ain Shams Engineering Journal, vol. 1 Issue 1, pp. 79-84.*
(Continued)

*Primary Examiner* — Dwayne J White
*Assistant Examiner* — Justin A Pruitt
(74) *Attorney, Agent, or Firm* — Wood Herron & Evans LLP

(57) ABSTRACT

A strip of fiber-reinforced polymeric material for a longitudinal reinforcing structure of a wind turbine blade, the strip having substantially flat upper and lower surfaces and extending longitudinally between first and second transverse edges, wherein an end region of the strip tapers in thickness towards the first transverse edge, and wherein one or more slots are defined in the tapered end region, the or each slot extending longitudinally from the first transverse edge of the strip into the tapered end region.

40 Claims, 9 Drawing Sheets

(51) Int. Cl.
*B29C 70/54* (2006.01)
*B29L 31/00* (2006.01)
*B29L 31/08* (2006.01)
*B32B 3/02* (2006.01)
*B32B 3/26* (2006.01)
*B32B 3/30* (2006.01)
*B32B 5/26* (2006.01)
*B29D 99/00* (2010.01)
*F03D 1/06* (2006.01)
*F03D 13/10* (2016.01)

(52) U.S. Cl.
CPC ........ *B29C 70/545* (2013.01); *B29D 99/0028* (2013.01); *B32B 3/02* (2013.01); *B32B 3/263* (2013.01); *B32B 3/30* (2013.01); *B32B 5/26* (2013.01); *F03D 13/10* (2016.05); *B29C 67/0044* (2013.01); *B29C 2793/009* (2013.01); *B29L 2031/003* (2013.01); *B29L 2031/085* (2013.01); *B32B 2260/021* (2013.01); *B32B 2260/046* (2013.01); *B32B 2262/106* (2013.01); *B32B 2603/00* (2013.01); *F05B 2230/10* (2013.01); *F05B 2230/24* (2013.01); *F05B 2230/41* (2013.01); *F05B 2280/2006* (2013.01); *F05B 2280/4003* (2013.01); *F05B 2280/6003* (2013.01); *F05B 2280/6015* (2013.01); *Y02E 10/721* (2013.01); *Y02P 70/523* (2015.11)

(58) Field of Classification Search
CPC ... B29C 70/525; B29C 70/526; B29C 70/547; B29C 70/68; B32B 3/02; B32B 3/263; B32B 3/30; B32B 5/26; B32B 2260/021; B32B 2260/046; B32B 2262/106; B32B 2603/00; B29D 99/0028; B29B 11/02; F05B 2230/10; F05B 2230/24; F05B 2230/41; F05B 2280/2006; F05B 2280/4003; F05B 2280/6003; F05B 2250/292; F05B 2280/6015; Y02E 10/721; Y02P 70/523; B64C 3/185
USPC ....................................................... 416/226
See application file for complete search history.

(56) References Cited

FOREIGN PATENT DOCUMENTS

| GB | 2497578 A | 6/2013 |
|---|---|---|
| WO | 2013007263 A2 | 1/2013 |

OTHER PUBLICATIONS

Intellectual Property Office, Combined Search and Examination Report issued in GB Application No. 1320166.0 dated Jul. 15, 2014.
European Patent Office, International Search Report and Written Opinion issued in International Patent Application No. PCT/DK2014/050385 dated Mar. 26, 2015.

* cited by examiner

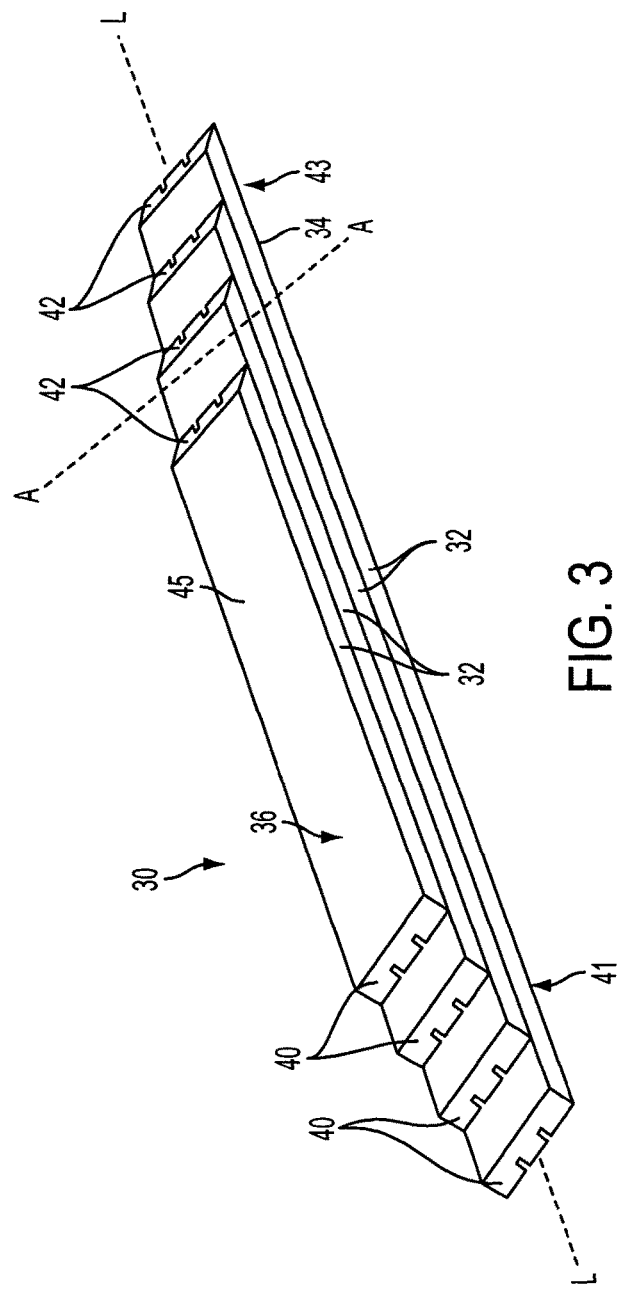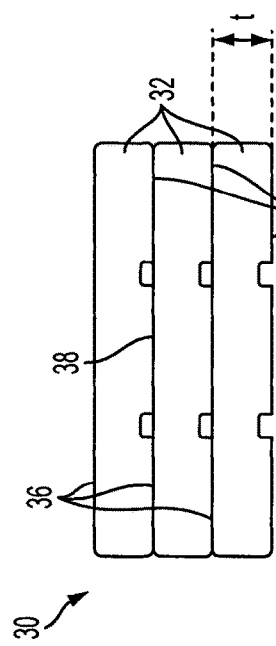
FIG. 3
FIG. 4

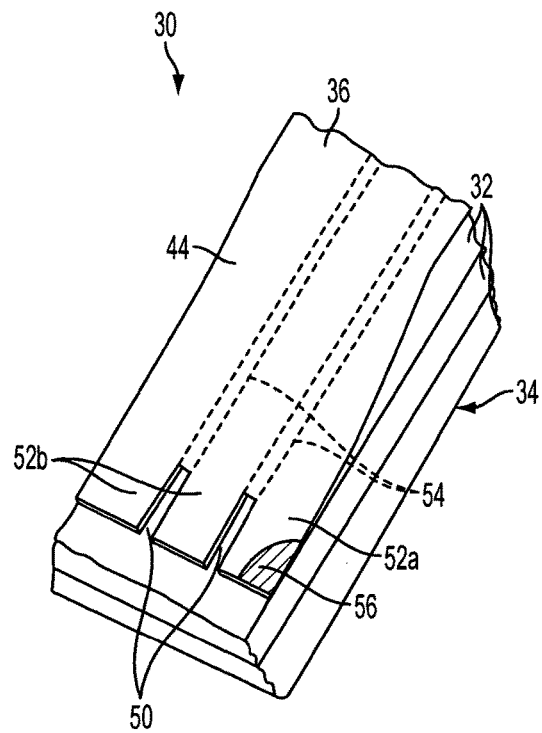
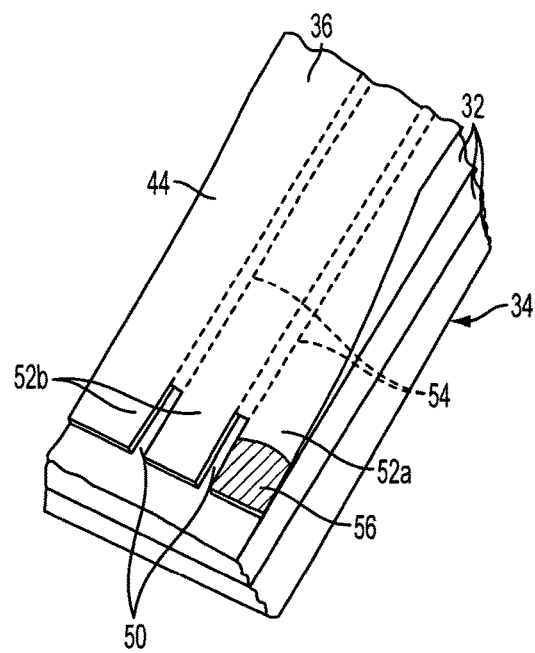
FIG. 9a
FIG. 9b
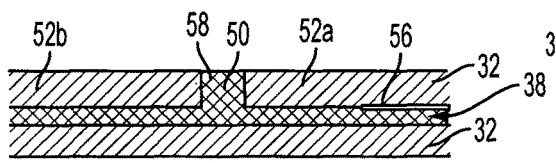
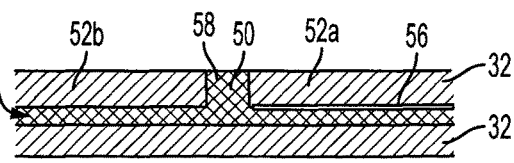
FIG. 9c
FIG. 9d

REINFORCING STRIP FOR A WIND TURBINE BLADE

FIELD OF THE INVENTION

The present invention relates to wind turbine components that include a stack of load-bearing structural elements, to methods of making such components and to structural elements for use in such components. In particular embodiments of the invention, the components are spar caps comprising a stack of reinforcing strips that are integrated within the shell of a wind turbine blade.

BACKGROUND TO THE INVENTION

FIG. 1 illustrates in cross-section a wind turbine rotor blade 10. The blade 10 has an outer shell 11 that is fabricated from two half shells: a windward shell 11a and a leeward shell 11b. The shells 11a, 11b are moulded from glass-fibre reinforced plastic (GRP). Parts of the outer shell 11 are of sandwich panel construction and comprise a core 12 of lightweight foam (e.g. polyurethane) sandwiched between inner and outer GRP layers or 'skins' 13, 14.

The blade 10 comprises a first pair of spar caps 15a, 15b and a second pair of spar caps 16a, 16b. The respective pairs of spar caps 15a, 15b and 16a, 16b are arranged between sandwich panel regions 12 of the outer shell 10. One spar cap 15a, 16a of each pair is integrated with the windward shell 11a and the other spar cap 15b, 16b of each pair is integrated with the leeward shell 11b. The spar caps of the respective pairs are mutually opposed and extend longitudinally along the length of the blade 10.

A first longitudinally-extending shear web 17a bridges the first pair of spar caps 15a, 15b and a second longitudinally-extending shear web 17b bridges the second pair of spar caps 16a, 16b. The shear webs 17a and 17b in combination with the spar caps 15a, 15b, 16a, 16b form a pair of I-beam structures, which transfer loads effectively from the rotating blade 10 to the hub of the wind turbine. The spar caps 15a, 15b, 16a, 16b in particular transfer tensile and compressive bending loads, whilst the shear webs 17a and 17b transfer shear stresses in the blade 10.

Figure illustrates in perspective view a conventional spar cap 15a. The spar cap 15a has a substantially rectangular cross section and is made up of a stack of pre-fabricated reinforcing strips 18. The strips 18 are pultruded strips of carbon-fibre reinforced plastic (CFRP), and are substantially flat and of rectangular cross section. The strips 18 are formed by pultrusion, a continuous process similar to extrusion, in which fibres are pulled through a supply of liquid resin and through dies that shape the strip 18. The resin is then cured, for example by heating in an open chamber, or by employing heated dies that cure the resin as the strip 18 is pultruded. The strips 18 have a high tensile strength, and hence have a high load-bearing capacity.

The number of strips 18 in the stack depends upon the thickness of the strips 18 and the required thickness of the shell 11, but typically the strips 18 each have a thickness of a few millimetres and there may typically be between four and twelve strips in the stack. The strips are of decreasing lengths moving from the lower-most strip 18 to the upper-most strip 18, and the ends 19 of the strips 18 are staggered along the length of the spar cap 15a. Each end 19 is tapered, so as to facilitate stress transfer between strips 18 in the stack.

To integrate the components of the wind turbine blade 10, a resin-infusion (RI) process is used. The structural components, including the stacks of strips 18 that will form the spar caps 15a, 15b, 16a, 16b, are laid up in the mould cavity. The components are sealed, a vacuum is applied to the sealed region, and resin is introduced. The vacuum pressure causes the resin to flow over and around the component layers and into the spaces between the stacked strips 18. To complete the process, the resin-infused layup is cured to harden the resin and bond the various laminate layers together to form the blade 10.

The pultruded reinforcing strips 18 described above tend to have a relatively smooth and flat outer surface 20 as a result of the pultrusion process. When the strips 18 are stacked one on top of another in the mould, there is therefore very little space between adjacent strips 18. This lack of space makes it difficult for air to move out of the stack when the vacuum is applied, and air can become trapped between the strips 18 and form air pockets. When resin is infused between the strips 18, the resin infuses around these air pockets, and the lack of space makes it difficult for the resin to push the air pockets out of the stack. The air pockets therefore remain between the strips which results in resin-free areas in the finished component. This is particularly problematic if a resin-free area forms at or near an end 19 of a strip 18. The resin-free area acts as a crack which can propagate under stress, causing delamination of the strips 18, and, in extreme cases, leading to failure of the blade 10.

It is an object of the invention to mitigate or overcome this problem.

SUMMARY OF THE INVENTION

Against this background, and from a first aspect, the invention resides in a strip of fibre-reinforced polymeric material for a longitudinal reinforcing structure of a wind turbine blade, the strip having substantially flat upper and lower surfaces and extending longitudinally between first and second transverse edges, wherein an end region of the strip tapers in thickness towards the first transverse edge, and wherein one or more slots are defined in the tapered end region, the or each slot extending longitudinally from the first transverse edge of the strip into the tapered end region.

The invention therefore provides a strip having a tapered end region in which slots are provided. When the strip is incorporated into a longitudinal reinforcing structure, and a plurality of such strips are stacked one-on-top-of-another and infused with resin, resin infuses into the slots and is cured to form a region of cured resin in each slot. These regions of cured resin act as crack-stoppers: air pockets trapped between strips and beneath the tapered end region of a strip, which can act as cracks that propagate to delaminate the strips, will not be able to propagate through the regions of cured resin in the slots. Thus, any air pockets trapped between the adjacent strips will cause delamination only a localised region of the strip, while the remainder of the strip will be shielded from the air pocket by the slots.

In this way, the likelihood of failure of the longitudinal reinforcing structure due to delamination of the strips is reduced by means of the slots. Thus, a longitudinal reinforcing structure that incorporates strips according to the invention, and therefore a wind turbine blade that incorporates such longitudinal reinforcing structures, is less likely to fail under stress.

The first transverse edge of the strip may be defined by a plurality of fingers that are mutually spaced apart by the or each slot. In this way, any delamination caused by an air pocket can be localised to the finger in which the air pocket originated.

The strip may comprise a plurality of slots mutually spaced apart along the first transverse edge. Each of the plurality of slots acts as a crack stopper, localising delamination to an even smaller region of the strip between the slots.

The strip may further comprise one or more longitudinally-extending grooves defined in the upper and/or lower surface of the strip. Grooves in the upper or lower surface of the strip are particularly advantageous, as they provide channels through which air may easily escape during the resin infusion process. This reduces the chance of air being trapped between the strips in the stack.

The or each slot may be defined at the end of a respective groove. In this way, each groove may lead into a slot, such that any air escaping via a groove during the resin infusion process can be easily released from between the strips by the slot.

The thickness of the strip adjacent the first transverse edge may be less than the depth of the or each groove, such that the or each groove defines the respective slot. This is particularly advantageous because forming the or each groove in the strip will form the respective slot or slots in the end region of the strip without the need for any additional manufacturing steps.

The or each groove may extend substantially along the entire length of the strip. In this way, the channels may be provided along the entire length of the strip to allow air to escape particularly effectively during the infusion process.

The or each groove may be a moulded groove. In this way, the or each groove may be moulded as the strip is made. For example, the or each groove may be moulded into the strip during a pultrusion process.

Alternatively, the or each groove may be formed by removing material from the strip. In this way, the or each groove may be formed after the strip has been formed. For example, the material may be removed from the strip in the course of other processing stages in the manufacturing cycle.

The or each groove may be defined in the lower surface of the strip. Alternatively, the or each groove may be defined in the upper surface of the strip.

The tapered end region of the strip may be defined by a tapered end portion of the upper surface. The tapered end portion of the upper surface is curved. This is particularly advantageous, as when the strip is arranged in a stack in the finished longitudinal reinforcing structure, the curved surface provides particularly good stress transfer between strips in the stack.

The tapered end portion of the upper surface may be formed by removing material from the strip.

In embodiments comprising one or more longitudinal grooves, and comprising a tapered end portion of the upper surface of the strip, the or each groove may be defined in the tapered end portion of the upper surface. In this way, the grooves can be provided in the tapered end portion of the upper surface as the tapered end portion is formed.

The or each slot may extend between approximately 5% and approximately 40% of the way into the tapered end region of the strip.

A second end region of the strip may taper towards the second transverse edge and one or more slots may be defined in the second end region. Preferred and/or optional features described above in relation to the first end region may apply alone or in appropriate combination to the second region also. The first and second end regions may be substantially the same, or, in some embodiments, features of the first and second end regions may differ.

The invention also extends to an elongate reinforcing structure for a wind turbine blade comprising a strip described above. In such an elongate reinforcing structure, the or each slot may be at least partially filled with a polymeric material.

The elongate reinforcing may comprise a plurality of strips as described above stacked one on top of another.

The elongate reinforcing structure may be a spar cap of a wind turbine blade.

The invention also extends to a wind turbine blade comprising the elongate reinforcing structure described above, to a wind turbine comprising such a wind turbine blade, and to a wind farm comprising such a wind turbine.

From another aspect, the invention resides in a method of making an elongate reinforcing structure for a wind turbine blade, the method comprising: a) providing a plurality of strips as described above; b) stacking the strips such that the upper or lower surface of each strip abuts the lower or upper surface of an adjacent strip in the stack to define an interface region between adjacent strips; c) supplying resin to the stacked strips and causing the resin to infiltrate into the interface regions between adjacent strips and into the or each slot; and d) curing the resin to bond the strips together.

The method according to the invention therefore produces an elongate reinforcing structure comprising a stack of strips, the strips comprising at least one slot, and the slot being at least partially filled with cured resin. The cured resin acts as a crack stopper, as described above. In this way, the longitudinal reinforcing structure according to the invention, and therefore a wind turbine blade that incorporates such longitudinal reinforcing structures, is less likely to fail under stress.

Step (b) may comprise stacking the plurality of strips in a mould tool. The mould tool may be a blade mould, or the mould tool may be a separate mould tool that is configured to mould a separate elongate reinforcing structure.

The method may comprise visually inspecting a length of the or each slot of the strip, and, if the length of the slot is below a threshold length, replacing the strip with a different strip, or machining the tapered end of the strip. This is a particular advantage of the present invention: the slots allow for easy visual inspection of the quality of the tapered end portion of the strip. This is in contrast to conventional strips, for which checking the quality of the tapered ends involves making a number of measurements and is relatively time consuming.

The invention also extends to an elongate reinforcing structure for a wind turbine blade made according to the method described above.

From another aspect, the invention resides in a method of making a strip for an elongate reinforcing structure of a wind turbine blade, the method comprising: a) providing an elongate strip of fibre-reinforced polymeric material, the strip having upper and lower substantially flat surfaces and extending longitudinally between first and second transverse edges; b) shaping an end region of the strip to form a tapered end region of the strip that tapers in thickness towards a transverse edge of the strip; and c) forming at least one slot in the strip that extends longitudinally from the transverse edge of the strip into the tapered end region.

Steps (b) and (c) may occur simultaneously, such that the tapered end region and the or each slot may be formed at the same time. This reduces the number of manufacturing steps, and hence reduces the time and cost required for the manufacturing process.

Step (a) may comprise forming the strip by a pultrusion process wherein reinforcing fibres are drawn through a pultrusion die.

The method may comprise forming one or more longitudinally-extending grooves in the upper and/or lower surface of the strip, the grooves extending along at least part of the tapered end region of the strip. In embodiments where the strip is formed by a pultrusion process, the pultrusion die may comprise features arranged to form the grooves in the strip as part of the pultrusion process. In this way, the grooves can be provided on the strip as the strip is pultruded, thereby removing the need for a separate groove-forming step.

Step (c) may comprise forming the at least one slot by shaping the end region of the strip such that the thickness of the strip at the transverse edge is less than the depth of the groove(s).

The method may comprise forming the grooves by removing material from the strip. Step (b) may comprise removing material from the strip to form the tapered end region. In this case, the method may comprise forming the grooves at the same time as forming the tapered end region, so that material is removed from the strip to form both the tapered end region and the grooves at the same time. To achieve this, the method may comprise tapering the end region of the strip using a grinding drum with groove-forming features defined on an outer surface of the drum.

The invention extends further to a method of making a wind turbine blade comprising: a) providing a plurality of strips as described above or made by the method described above; b) stacking the strips in a blade mould with other blade components, such that the upper or lower surface of each strip abuts the lower or upper surface of an adjacent strip in the stack to define an interface region between adjacent strips; and c) integrating the stacked strips and other blade components to form a blade by: i) supplying resin to the stacked strips and other blade components; ii) causing the resin to infiltrate into the interface regions between adjacent strips and other blade components; and iii) curing the resin to bond the strips together.

BRIEF DESCRIPTION OF THE FIGURES

FIGS. 1 and 2, which are respectively a cross-sectional view of a conventional wind turbine rotor blade and a perspective view of a spar cap forming part of a conventional wind turbine rotor blade, have already been described above by way of background to the invention. In order that the invention might be more readily understood, specific embodiments of the invention will now be described with reference to the remaining figures, in which:

FIG. 3 is a perspective view of an elongate reinforcing structure for a wind turbine blade according to an embodiment of the invention;

FIG. 4 is a cross-sectional view of the elongate reinforcing structure of FIG. 3 along the line A-A;

FIG. 8b is an enlarged view of part of FIG. 8a;

FIGS. 9a and 9b are partial perspective views of the elongate reinforcing structure of FIG. 3, illustrating the effect of the presence of an air pocket in the elongate reinforcing structure, and FIGS. 9c and 9d are transverse cross-sectional views of FIGS. 9a and 9b;

FIG. 17b is an enlarged view of part of FIG. 17a;

DETAILED DESCRIPTION OF EMBODIMENTS OF THE INVENTION

Figure 1:
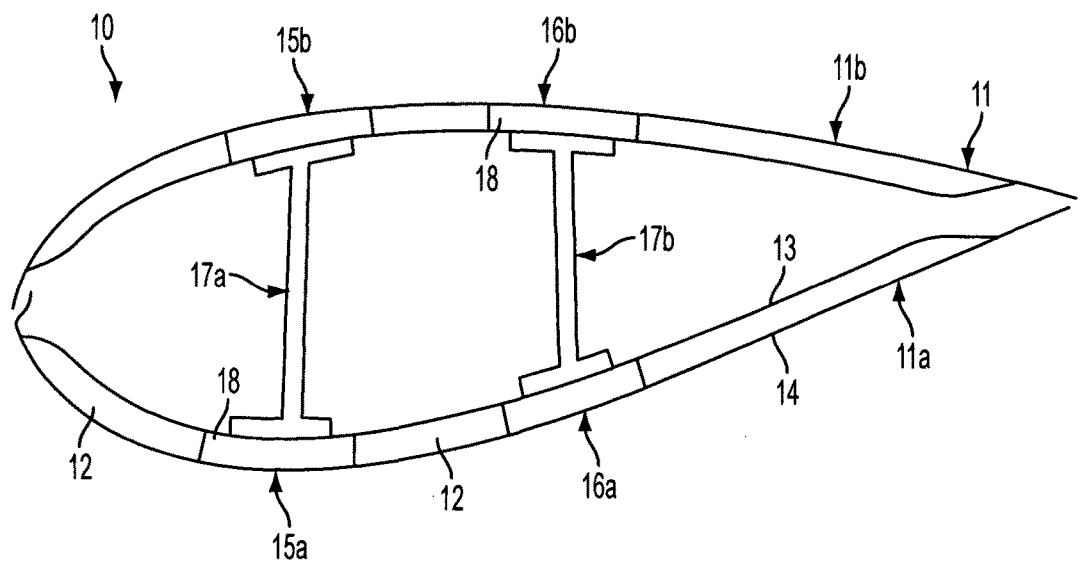
Figure 2:
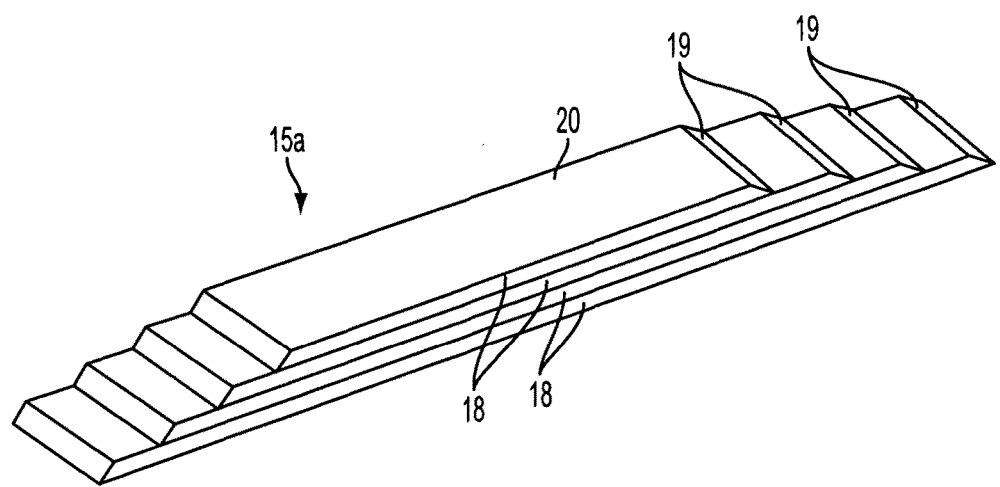

FIGS. 3 and 4 illustrate a reinforcing structure 30 for a wind turbine blade in the form of a longitudinally-extending spar cap.

The spar cap 30 is elongate to define a longitudinal axis L, and comprises a plurality of structural elements in the form of elongate strips 32 of fibre-reinforced polymeric material stacked one on top of another. Each strip 32 comprises a lower major surface 34 and an upper major surface 36. When arranged in the stack, the lower surface 34 of one strip 32 abuts an upper surface 36 of an adjacent strip 32 in the stack, and an interface region 38, best seen in FIG. 4, is defined between adjacent strips 32.

The terms 'lower' and 'upper' are used herein for convenience and to assist the readability of the description. However, these terms should not be treated as unduly limiting the scope of the invention. It should be appreciated that in some cases the lower surface 34 of a strip 32 may be above the upper surface 36. This will occur when the strips 32 are turned upside down, for example when the strips 32 are integrated in a wind turbine blade then the orientation of the strips 32 will depend upon the orientation of the blade. Nevertheless, the terms 'upper' and 'lower' are convenient when considering a strip 32 in isolation.

The perpendicular distance between the lower and upper surfaces 34, 36 of the strip 32 defines the thickness t of the strip as shown in FIG. 4. In the embodiment illustrated, the majority of the surfaces 34, 36 are flat, so that the thickness of the majority of the strip 32 is constant and is approximately 5 mm.

Referring again to FIG. 3, each strip 32 comprises two end regions 40, 42 disposed at opposite ends 41, 43 of the strip 32; a first end region 40 at a first end 41 of the strip 32, and a second end region 42 at a second end 43 of the strip 32. The end regions 40, 42 are mirror images of one another. For ease of reference, a first end region 40 of a strip 32 will be described with reference to FIGS. 5 to 7, although it will be appreciated that corresponding features of the second end region 42 are substantially the same as those of the first end region 40.

Figure 5:
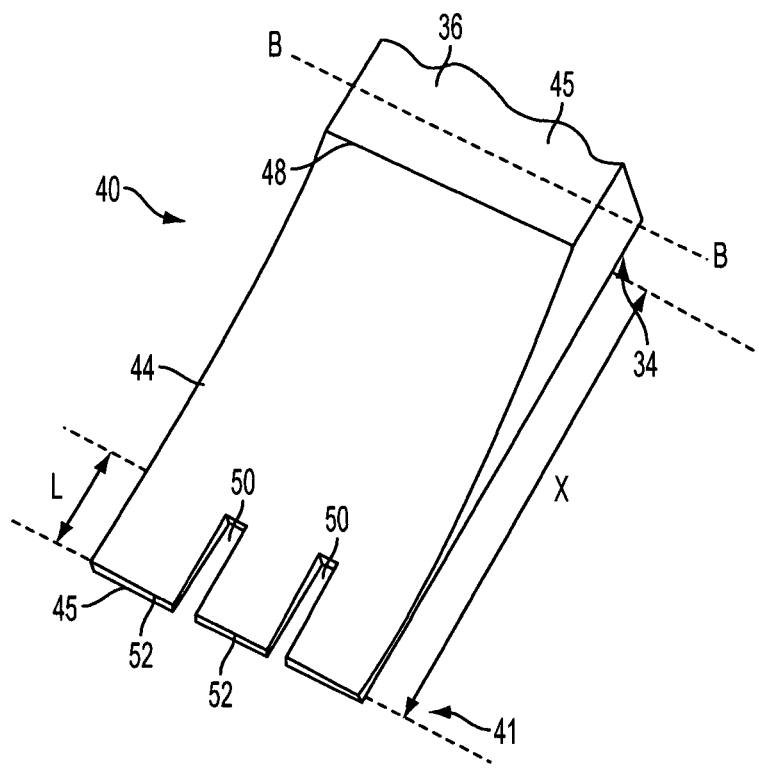
FIG. 5 is a partial perspective view of a strip of fibre-reinforced polymeric material forming part of the elongate reinforcing structure of FIG. 3.
Figure 6:
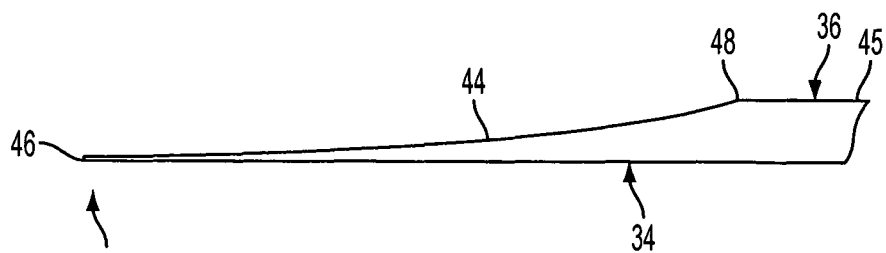
FIG. 6 is a partial side view of the strip of FIG. 5.

FIG. 5 shows the first end region 40 of a single strip 32. In the first end region 40, an end portion of the upper surface 36 is inclined downwardly (i.e. towards the lower surface 34) so as to define a tapered end surface 44 that forms part of the upper surface 36. In other words, the end region 40 of the strip 32 tapers in thickness moving towards a transverse edge 46 of the strip 32.

At one end of the end region 40, the tapered end surface 44 of the upper surface 36 meets the lower surface 34 to define the transverse edge 46. At the other end of the end region 40, the tapered end surface 44 meets a substantially flat central portion 45 of the upper surface 36 to define a ridge 48 of the strip 32. In the embodiment shown, the tapered end surface 44 defines a substantially parabolic curve and extends into the strip 32 by a distance that is approximately 500 mm, as represented by the double-headed arrow X in FIG. 5.

Referring still to FIG. 5, towards the first end 41 of the strip 32, the tapered end region 40 comprises a series of mutually-adjacent longitudinal slots 50 that extend longitudinally from the transverse edge 46 of the strip 32 into the first end region 40. The slots 50 are mutually spaced apart such that finger portions 52 are defined between the slots 50. The slots 50 and the finger portions 52 do not extend all the way from the transverse edge 46 to the ridge 48, but instead extend only partially into the tapered end surface 44, stopping short of the ridge 48. In the embodiment shown, the slots 50 extend approximately 10% of the way into the tapered end surface 44, having a length, indicated by the dimension L in FIG. 5, of approximately 50 mm. In other embodiments, the slots may be between approximately 20 mm and approximately 150 mm.

Figure 7:
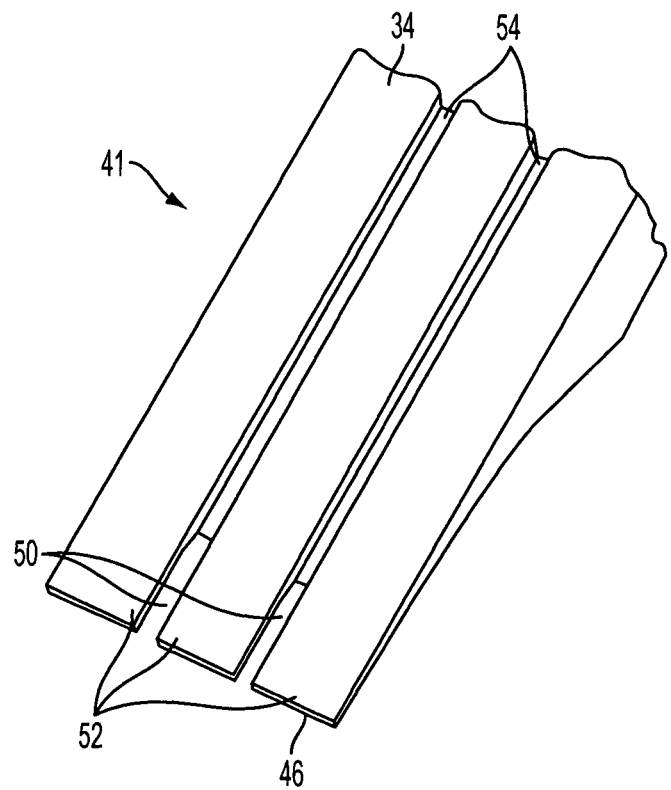
FIG. 7 is a partial perspective view from below of the strip of FIG. 5.

FIG. 7 shows the underside of the strip 32 and reveals that the slots 50 in the tapered end region 40 are defined by grooves 54 in the lower surface 34 of the strip 32. The grooves 54 are parallel channels that extend longitudinally and continuously between the respective transverse edges 46 of the strip 32. Due to the tapered end regions 40 of the strip 32, the thickness of the strip 32 near the transverse edge 46 is less than the depth of the grooves 54, such that at each end 41, 43 of the strip 32 the grooves 54 emerge in the tapered end surface 44 to define the slots 50.

Figure 8A:
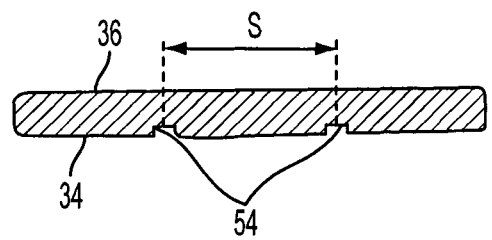
FIG. 8a is a cross-sectional view of the strip of FIG. 5 along the line B-B in FIG. 5.
Figure 8B:
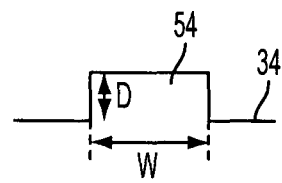

Referring now to the transverse cross-sectional views of FIGS. 8a and 8b, here it can be seen that the grooves 54 are substantially rectangular in cross section. A width of each groove 54, indicated by the dimension w on FIG. 8b, is approximately 2 mm, and may be between and a depth of each groove 54, indicated by the dimension d on FIG. 8b, is approximately 0.7 mm. Because the thickness of the majority of the strip 32 is approximately 2 mm, each groove 54 extends through approximately 35% of the thickness of the strip 32, except in the tapered end regions 40, 42. In this example, the grooves 54 are mutually spaced apart by a spacing distance, indicated by the dimension s on FIG. 8a, which is approximately 33 mm. The spacing distance s is the distance between corresponding points of adjacent grooves 54, for example between the midpoints of the respective grooves 54 as shown in FIG. 8a.

To make a spar cap 30 of the type illustrated in FIG. 3, a plurality of strips 32 are stacked one on top of another in a mould cavity (not shown), together with other structural elements of the blade. The strips 32 are stacked such that the lower surface 34 of one strip 32 abuts the upper surface 36 of an adjacent strip 32 in the stack, and such that the ends 41, 43 of the strips 32 are staggered. The components of the blade are sealed, and a vacuum is applied to the sealed region. When the vacuum is applied to the stack, air is pushed out of the interface regions 38 between adjacent strips 32. Resin is then introduced into the sealed region and infused around the strips 32 and into the interface regions 38. Resin also infuses into the slots 50 and the grooves 54 of each strip 32, and the grooves 54 act as flow paths for the resin, encouraging resin into the interface region 38 between strips 32 (see FIG. 4). Finally, the resin is cured.

As has already been described by way of background to the invention, during this process air pockets can form in the interface regions 38 between adjacent strips 32. However, when using strips according to an embodiment of the invention, the presence of the grooves 54 in the lower surface 34 and the slots 50 in the end region 40 of the strip 32 mitigates the effect of these air pockets, as will now be described.

Firstly, during the manufacturing process, as the vacuum is applied to the stack of strips 32, the grooves 54 in the lower surfaces 34 provide relatively easy air flow paths that extend across the length of the strip 32. To remove air from the interface region 38, the air need not be pushed all the way to an edge of the strip 32, but need only be pushed to the nearest groove 54 in order to escape from the interface region 38 via the easy air flow path provided by the groove 54. Thus, air is more easily removed from the interface region 38 when the vacuum is applied, and air pockets are less likely to form.

Secondly, should an air pocket form in an end region 40, 42 of the strip 32 despite the presence of the grooves 54, the detrimental effect of the air pocket 56 on the spar cap 30 when in its final, cured state is reduced by the presence of the slots 50 and the finger portions 52 in the end region 40 of the strip 32, as will now be described with reference to FIGS. 9a to 9d.

As has been described by way of background, once the resin has been cured and the spar cap 30 is in its finished state, an air pocket 56 formed in the interface region 38 of a finger portion 52a of the strip 32 will act as a crack. The crack 56 will advance through the interface region 38 of the finger portion 52a on application of a stress, propagating between the strip 32 and the resin in the interface region 38, as shown in FIGS. 9a and 9c.

The crack 56 propagates through the interface region 38, delaminating the finger portion 52a as it advances. When the crack 56 reaches the slot 50 the interface region 38 is interrupted, and the crack 56 meets a wall of cured resin 58. The resin 58 is of high toughness, and so the crack 56 cannot easily penetrate through the resin 58 in the slot 50. The crack 56 therefore stops, and cannot propagate into the slot 50.

In this way, the air pocket 56 will cause delamination only of the finger portion 52a in which it originated, while the remaining finger portions 52b will be shielded from the air pocket 56 by the slots 50. The detrimental effect of the air pocket 56 is thereby limited to a single finger portion 52a of the strip 32.

Thus, even if an air pocket 56 does form, the air pocket 56 will cause delamination of only one finger portion 52a of the strip 32, rather than delamination of the entire strip 32. Propagation of the crack 56 is therefore hindered by the slots 50, and a spar cap 30 that incorporates strips 32 according to the invention, and therefore a wind turbine blade that incorporates such spar caps, is less likely to fail under stress.

Figure 11:
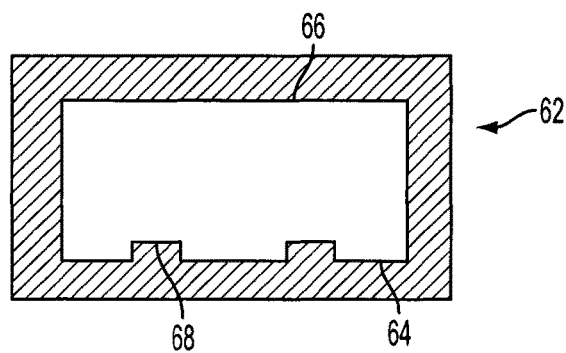
FIG. 11 is a cross-sectional view of a die forming part of the apparatus of FIG. 10.
Figure 12:
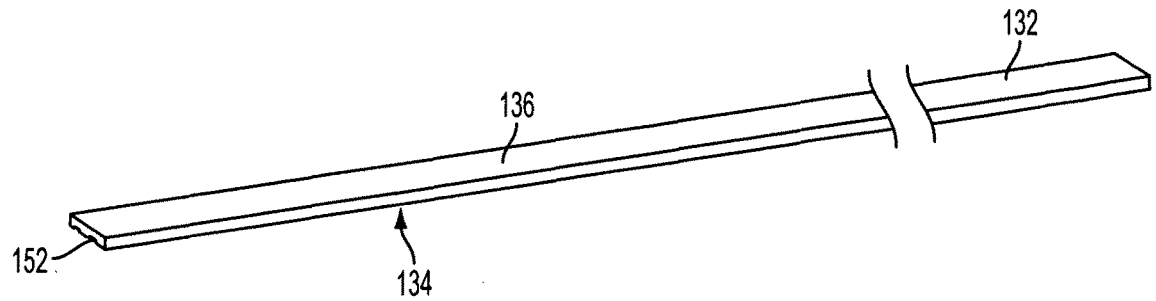
FIG. 12 is a perspective view of a pultruded strip made using the apparatus of FIGS. 10 and 11.

The strip 32 described above is made using a two-stage manufacturing process that will now be described with reference to FIGS. 10 to 12.

Figure 10:
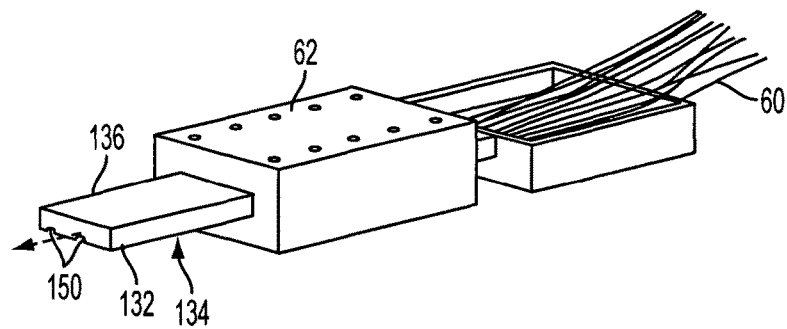
FIG. 10 is a perspective view of a pultrusion apparatus for forming the strip of FIGS. 3-9.

In the first stage, a strip 132 of fibrous material is formed by a pultrusion process, as illustrated in FIG. 10. To form the strip 132, carbon fibres 60 are soaked in resin and are pulled through a die 62.

The cross section of the die 62 controls the cross-section of the strip 132 that is formed by the pultrusion process. As can be seen in FIG. 11, the die 62 comprises lower and upper moulding surfaces 64, 66 that mould respective lower and upper surfaces 134, 136 of the strip 132. The lower moulding surface 64 is provided with groove-forming features in the form of protrusions 68 that protrude inwardly from the lower moulding surface 64. As the carbon fibres 60 are pulled through the die 62, the protrusions 68 form grooves 154 in the lower surface 134 of the master strip 132. The shape of the grooves 154 is determined by the shape of the protrusions 68; in this case, the protrusions 68, and hence the grooves 154, are rectangular in cross section. The carbon fibres 60 are continuously pultruded through the die 62 to form the strip 132, which is shown in isolation in FIG. 12.

In the second stage of the manufacturing process, the tapered end surfaces 44 are formed at the end regions 40, 42 of the strip 132 to form the structural elements 32 of the spar cap 30.

To shape the tapered end surfaces 44, a grinding drum is applied to the upper surface 136 of the strip 132 at each end of the strip. The drum is rotated to remove material from the strip 132. As the drum is rotated, it is moved back and forth across the end region 40 of the strip 132. The movement of the drum can be controlled so as to shape the tapered end surfaces 44 as required, in this case to form a parabolic curve.

As material is removed from the end region 40 of the strip 32, the grooves 54 in the lower surface 34 are exposed in the tapered end surface 44 of the upper surface 36. Exposing the grooves 54 in this way forms the groove openings or slots 50 in the tapered end region 40.

It will be appreciated that the length L of the slots 50 (see FIG. 5) is dependent upon the shape of the tapered end surface 44 of the upper surface 36 and the depth, d of the grooves 54 (see FIG. 8b). The length of the slots 50 can therefore be controlled by varying the size of the groove-forming features 68 of the pultrusion die 62 (see FIG. 11), or by varying the shape of the tapered end surface 44. For example, a deeper groove 54, and/or a more shallow curve of the tapered end surface 44 will result in longer slots 50.

Once the tapered end surface 44 has been formed in the first end region 40, material is removed using the same grinding method from the second end region 42 of the strip, to form a tapered end surface 44 in the second end region 42, thereby exposing the grooves 54 and forming slots 50 at the second end 43 of the strip 32.

The strip 32 is then ready to be incorporated into the spar cap 30 forming part of a wind turbine blade, using the method that has already been described.

The slots 50 also provide a convenient visual indication of the quality of the tapered end region 40, 42 of the strip 32. Since the shape of the tapered end surface 44 governs the length of the slots 50, the length of the slots 50 can be quickly checked by eye, or measured accurately if required, to confirm that the tapered end surface 44 is the correct shape. If the slots 50 are too short, this is an indication that the tapered end surface 44 is too steeply tapered, or that an end portion of the strip 32 has broken off, and the strip 32 can be rejected and replaced with a new strip 32 or machined to achieve the desired shape. This is a particular advantage of the present invention because otherwise checking the quality of the tapered ends 40, 42 involves making a number of measurements and is relatively time consuming.

A strip 232 according to a second embodiment of the invention, in which grooves 254 are provided in the upper surface 236 of the strip 232, rather than the lower major 234 surface of the strip 232, will now be described with reference to FIGS. 13 to 18.

Figure 13:
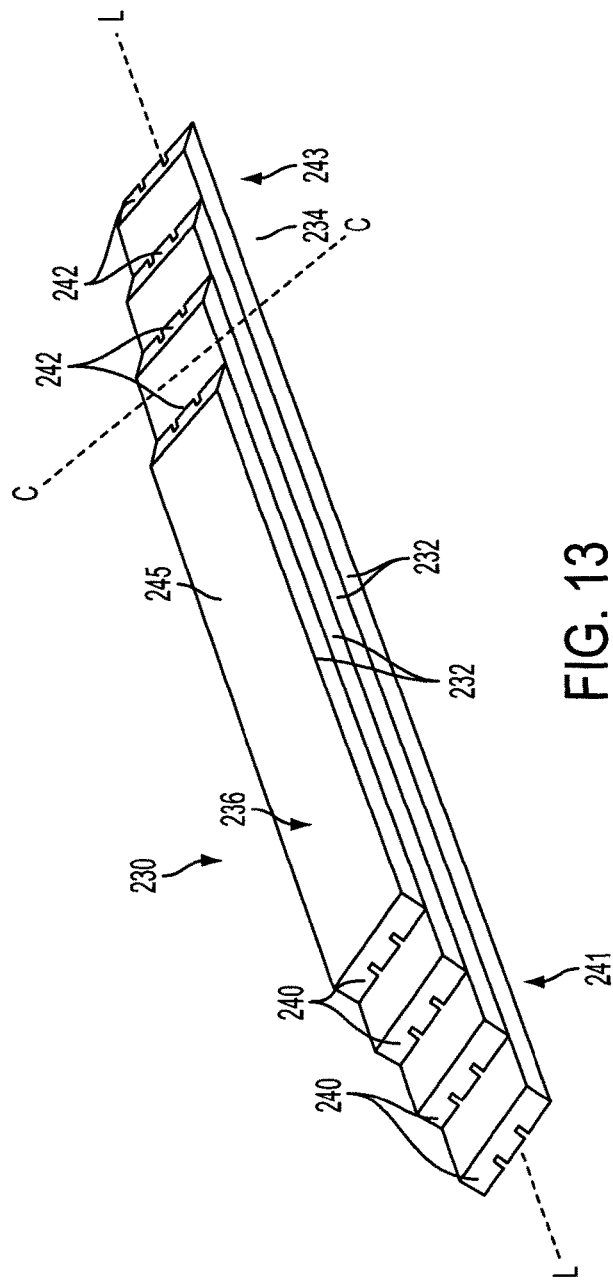
FIG. 13 is a perspective view of another elongate reinforcing structure for a wind turbine blade.
Figure 14:
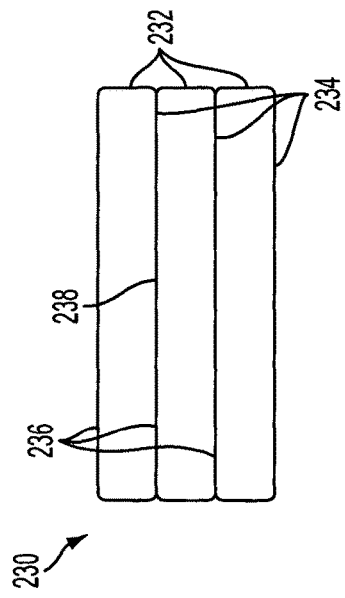
FIG. 14 is a cross-sectional view of the elongate reinforcing structure of FIG. 13 along the line C-C of FIG. 13.

FIGS. 13 and 14 illustrate a spar cap 230 incorporating a plurality of strips according to the second embodiment of the invention. The spar cap 230 is of substantially the same form as the spar cap 30 of FIG. 3, being comprised of a plurality of stacked strips 232, and so will not be described in further detail to avoid repetition.

Each strip 232 is of generally the same form as the strip 32 illustrated in FIG. 5. In particular, the configuration of the upper and lower surfaces 234, 236, the tapered end portions 244 of the upper surface 234, and the transverse edges 246 are substantially the same, and will not be described again in detail to avoid repetition.

Figure 15:
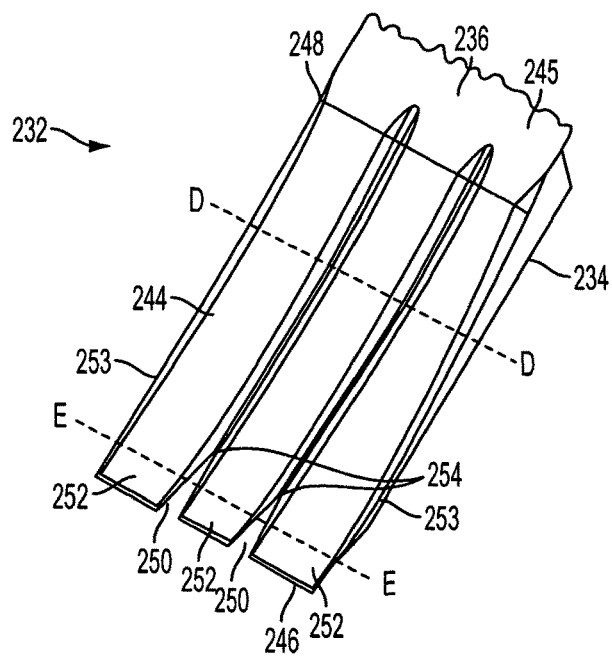
FIG. 15 is a partial perspective view of a strip according to the second embodiment of the invention.
Figure 16:
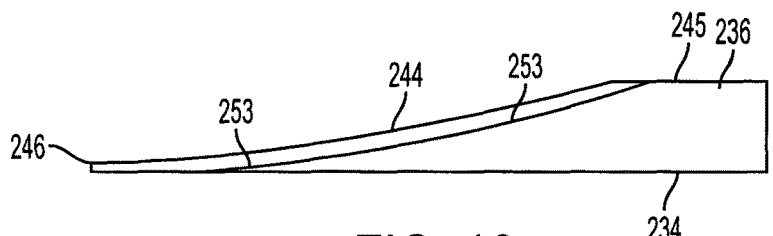
FIG. 16 is a partial side view of the strip of FIG. 15.

As shown in FIG. 15, the strips 232 according to the second embodiment comprise a plurality of mutually-adjacent longitudinal grooves 254 in the tapered end surface 244 of the upper surface 236. The grooves 254 extend along the tapered end surface 244, from the ridge 248 to the transverse edge 246. In view of the tapering thickness towards the transverse edge 246 of the strip 232, the grooves 254 become generally 'V'-shaped slots 250 at the transverse edge 246. The grooves 254, and hence the slots 250, are mutually spaced apart such that finger portions 252 are defined between the slots 250. Grooves 254 are also provided at outer edges of the tapered end surface 244, to define chamfers 253 on the edges of the strip 232 in the end region 240.

Figure 17A:
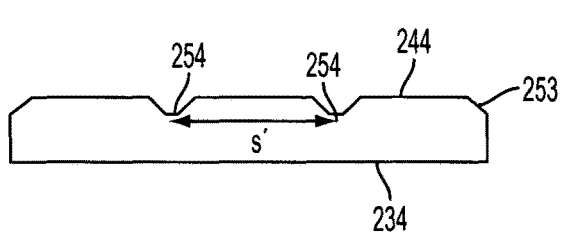
FIG. 17a is a cross-sectional view of the strip of FIG. 15 along the line D-D.
Figure 17B:
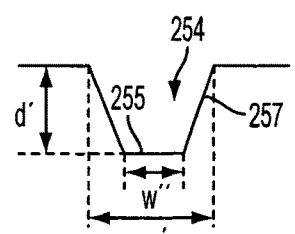

Referring now to FIGS. 17a and 17b, a cross section of each groove 254 perpendicular to the longitudinal axis L is shaped substantially as a trapezium. The groove 254 has a flat base surface 255 and two side walls 257. The side walls 257 are each inclined inwardly, moving from a mouth of the groove 254 to the base surface 255 of the groove 254. At the mouth of the groove 254, the width of each groove 254, indicated by the dimension w' on FIG. 17b, is approximately 2 mm in this example. At the base 255 of the groove 254, the width of each groove 254, indicated by the dimension w" on FIG. 17b, is approximately 0.2 mm in this example. A depth of each groove 254, measured by the perpendicular distance between the mouth and the base surface 255 and indicated by the dimension d' on FIG. 17b, is approximately 0.7 mm in this example. The grooves 254 are mutually spaced apart by a spacing distance s', which is approximately 33 mm in this example. The spacing distance s is the distance between corresponding points of adjacent grooves 254, for example between the midpoints of the respective grooves 254 as shown in FIG. 17a.

Figure 18:
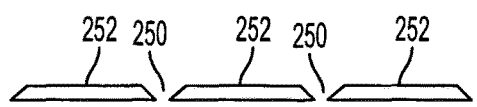
FIG. 18 is a cross-sectional view of the strip of FIG. 15 along the line E-E in FIG. 15.

As mentioned with regard to the first embodiment, the shape of the grooves 254 controls the shape of the corresponding slots 250. The slots 250 emerge in the lower surface 234 when the thickness of the strip 232 becomes less than the depth of the groove 254. Referring now to FIG. 18, due to the tapered walls 257 of the grooves 254, the width of the slots 250 varies. At the edge 246 of the strip 232, the slot 250 is at its widest and has a width equal to the width w' at the mouth of the groove 254. The width of the slot 250 decreases as the slot 50 extends into the tapered end surface 244, until the slot terminates with a width that is equal to the width w" of the base 255 of the groove 254. In the way, the slots 250 are generally 'V'-shaped.

The strips 232 are integrated into the spar cap 230 using the resin-infusion process that has already been described above with reference to the first embodiment and so will not be described here to avoid repetition.

When a strip 232 according to the second embodiment is integrated into a spar cap 230, the slots 250 act as crack stoppers in the same manner as the slots 50 of the strips 30 of the first embodiment. The grooves 254 and the chamfers 253 also act as flow paths for resin during the resin infusion process that encourage resin into the interface region 238 between the strips 232 (see FIG. 14).

The strips 232 of the second embodiment are made using a two-stage manufacturing process that will now be described with reference to FIG. 19.

In the first stage, a strip 332 comprising a continuous elongate strip of fibrous material is formed by a pultrusion process. The strip 332 is made by a standard pultrusion process, and as such does not comprise grooves on either of its surfaces 334, 336.

In the second stage of the manufacturing process, the tapered end surfaces 244 are formed at the end regions 240, 242 of the strip 232 using the grinding method that has already been described. However, in this embodiment, the grinding drum 60, illustrated in FIG. 19 is configured to form the grooves 254 in the strip 232 as the tapered end surfaces 244 are formed.

Figure 19:
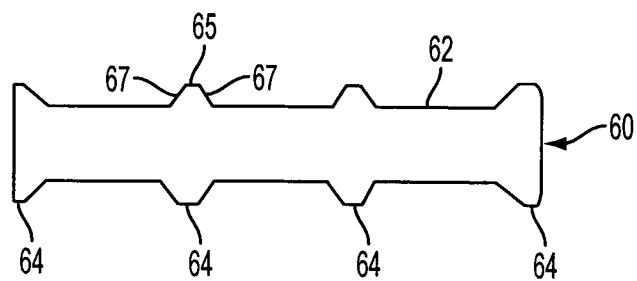
FIG. 19 is a transverse cross-sectional view of a drum forming part of an apparatus for making the strip of FIGS. 15 to 18.

As seen in FIG. 19, the drum 60 has an outer surface 62 that carries groove-forming features in the form of circumferential ridges 64. In FIG. 19 the size of the ridges 64 has been exaggerated for illustrative purposes. The ridges 64 protrude from the surface 62 of the drum. A cross section of the ridges 64 corresponds to the cross section of the grooves 54. Each ridge 64 therefore comprises a base wall 65 having a width w" that is equal to the width w" of the base surface 255 of the groove 254, and two inclined side walls 67. Where the side walls 67 meet the outer surface 62, the ridges 64 have a width w', which is equal to the width w' of the mouth of the grooves 254 shown in FIG. 17b. The ridges 64 have a height that is equal to the depth d of the grooves 254.

As the drum 60 rotates, the ridges 64 grind the grooves 54 in the tapered end part 244 of the upper surface 236 of the strip 232. Near the edge 246 of the strip 32, for example as illustrated in FIG. 18, the thickness of the strip 232 is less than the height of the ridges 64. The groove-forming features 64 therefore grind through the thickness of the strip 232 to form the slots 250. Away from the edge 246 of the strip 232, for example as illustrated in FIG. 17a, the thickness of the strip 232 is greater than the height of the ridges 64. The ridges 64 therefore do not grind through the entire thickness of the strip 232 in this region, and the slots 250 are absent from this region of the tapered end surface 244.

In this way, the groove-forming features 64 of the drum 60 form the grooves 254 and the slots 250 in the strip 232 at the same time as forming the tapered end surface 244 of the strip.

It will be appreciated that the first and the second embodiments could be combined, such that grooves 54, 254 are provided in both the lower surface 34, and the tapered end surface 244 of the upper surface 236. One way of achieving this is to employ the grinding drum 60 with circumferential ridges 64 as described in relation to the second embodiment to taper the end of the pultruded strip 32 described in relation to the first embodiment, i.e. with grooves 54 formed on the underside of the strip 32.

Figure 20:
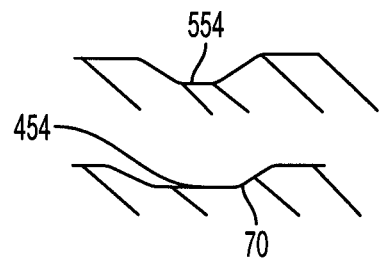
FIG. 20 is two partial cross-sectional views of two strips according to further embodiments of the invention.

Although in the embodiments described the grooves are of substantially rectangular or trapezoidal cross-section, it will be appreciated that the grooves may have a cross section of any other suitable shape. For example, as illustrated in FIG. 20, corners 70 of the groove 454 may be radiused, or the groove 554 may have a cross section that defines a curve. This blunts the corners 70 of the groove 454, 554, and prevents the corners 70 acting as crack initiators.

The grooves may have any suitable dimensions, and in particular may be between approximately 2 mm and 10 mm wide and between approximately 0.3 mm and 1.5 mm deep. Any suitable number of grooves may be provided, and the spacing between the grooves may be any suitable spacing. For example, between two and ten grooves may be provided, and the spacing between the grooves may be between approximately 20 mm and 50 mm. It will be appreciated that the end portions of the strip may have a corresponding number of fingers.

Figure 21:
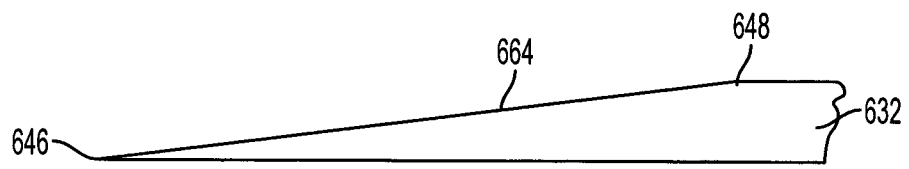
FIG. 21 is a partial side view of a strip according to another embodiment of the invention.

The tapered end surface need not be curved, but may be of any other suitable shape, so long as the shape is configured to facilitate stress transfer between adjacent strips. For example, as shown in FIG. 21, the tapered end surface 644 may be flat, so as to extend linearly between the edge 646 and the ridge 648 of the strip 632.

The first stage of the manufacturing process, in which a strip is formed by the pultrusion process, and the second stage of the manufacturing process, in which the tapered end surface is formed, may occur in separate manufacturing facilities, and the pultruded strip may be transferred between facilities for different manufacturing stages. Alternatively, the manufacturing stages may occur in the same facility.

Whilst the method of making the spar cap described above involves stacking the strips in a wind turbine blade mould, it will be appreciated that the stack may instead be formed separately from the rest of the wind turbine blade, for example, in a separate mould, before being integrated into the wind turbine blade layup.

The present invention is therefore not limited to the exemplary embodiments described above and many other variations or modifications will be apparent to the skilled person without departing from the scope of the present invention as defined by the following claims.

The invention claimed is:

1. A strip of fibre-reinforced polymeric material for a longitudinal reinforcing structure of a wind turbine blade, the strip having substantially flat upper and lower surfaces and extending longitudinally between first and second transverse edges, wherein an end region of the strip tapers in thickness towards the first transverse edge, wherein one or more slots are defined in the tapered end region, the or each slot extending longitudinally from the first transverse edge of the strip into the tapered end region, wherein the first transverse edge of the strip is defined by a plurality of fingers that are mutually spaced apart by the or each slot, and wherein the fingers only extend within the tapered end region.

2. The strip of claim 1, wherein the strip comprises a plurality of slots mutually spaced apart along the first transverse edge.

3. The strip of claim 1, further comprising one or more longitudinally-extending grooves defined in the upper and/or lower surface of the strip.

4. The strip of claim 3, wherein the or each slot is defined at the end of a respective groove.

5. The strip of claim 3, wherein the thickness of the strip adjacent the first transverse edge is less than the depth of the or each groove, such that the or each groove defines the respective slot.

6. The strip of claim 3, wherein the or each groove extends substantially along the entire length of the strip.

7. The strip of claim 3, wherein the or each groove is a moulded groove.

8. The strip of claims 3, wherein the or each groove is formed by removing material from the strip.

9. The strip of claim 3, wherein the or each groove is defined in the lower surface of the strip.

10. The strip of claim 1, wherein the tapered end region of the strip is defined by a tapered end portion of the upper surface.

11. The strip of claim 10, wherein the tapered end portion of the upper surface is curved.

12. The strip of claim 10, wherein the tapered end portion of the upper surface is formed by removing material from the strip.

13. The strip of claim 10, wherein the or each groove is defined in the tapered end portion of the upper surface.

14. The strip of claim 1, wherein the or each slot extends between approximately 5% and approximately 40% of the way into the tapered end region of the strip.

15. The strip of claim 1, wherein a second end region of the strip tapers towards the second transverse edge and wherein one or more slots are defined in the second end region.

16. The strip of claim 1, wherein the closed end of the or each slot is in the tapered end region.

17. An elongate reinforcing structure for a wind turbine blade comprising a strip according to claim 1.

18. The elongate reinforcing structure of claim 17, wherein the or each slot is at least partially filled with a polymeric material.

19. The elongate reinforcing structure of claim 17, comprising a plurality of strips stacked one on top of another.

20. The elongate reinforcing structure of claim 17, wherein the elongate reinforcing structure is a spar cap of a wind turbine blade.

21. A wind turbine blade comprising the elongate reinforcing structure of claim 17.

22. A wind turbine comprising the wind turbine blade of claim 21.

23. A wind farm comprising a wind turbine according to claim 22.

24. A method of making an elongate reinforcing structure for a wind turbine blade, the method comprising:
(a) providing a plurality of strips according to claim 1;
(b) stacking the strips such that the upper or lower surface of each strip abuts the lower or upper surface of an adjacent strip in the stack to define an interface region between adjacent strips;
(c) supplying resin to the stacked strips and causing the resin to infiltrate into the interface regions between adjacent strips and into the or each slot; and
(d) curing the resin to bond the strips together.

25. The method of claim 24, wherein step (b) comprises stacking the plurality of strips in a mould tool.

26. The method of claim 24, comprising visually inspecting a length of the or each slot of the strip, and, if the length of the slot is below a threshold length, replacing the strip with a different strip, or machining the tapered end of the strip.

27. An elongate reinforcing structure for a wind turbine blade made according to the method of claim 24.

28. A method of making a strip for an elongate reinforcing structure of a wind turbine blade, the method comprising: (a) providing an elongate strip of fibre-reinforced polymeric material, the strip having upper and lower substantially flat surfaces and extending longitudinally between first and second transverse edges; (b) shaping an end region of the strip to form a tapered end region of the strip that tapers in thickness towards a transverse edge of the strip; and (c) forming at least one slot in the strip that extends longitudinally from the transverse edge of the strip into the tapered end region, wherein the transverse edge of the strip is defined by a plurality of fingers that are mutually spaced apart by the at least one slot, and wherein the fingers only extend within the tapered end region.

29. The method of claim 28, wherein steps (b) and (c) occur simultaneously.

30. The method of claim 28, wherein step (a) comprises forming the strip by a pultrusion process wherein reinforcing fibres are drawn through a pultrusion die.

31. The method of claim 28, further comprising forming one or more longitudinally-extending grooves in the upper and/or lower surface of the strip, the grooves extending along at least part of the tapered end region of the strip.

32. The method of claim 31, wherein step (a) comprises forming the strip by a pultrusion process wherein reinforcing fibres are drawn through a pultrusion die, and wherein the pultrusion die comprises features arranged to form the grooves in the strip as part of the pultrusion process.

33. The method of claim 31, wherein step (c) comprises forming the at least one slot by shaping the end region of the strip such that the thickness of the strip at the transverse edge is less than the depth of the groove(s).

34. The method of claim 31, comprising forming the grooves by removing material from the strip.

35. The method of claim 31, further comprising forming the grooves at the same time as forming the tapered end region.

36. The method of claim 28, wherein step (b) comprises removing material from the strip to form the tapered end region.

37. The method of claim 35, comprising tapering the end region of the strip using a grinding drum with groove-forming features defined on an outer surface of the drum.

38. A method of making a wind turbine blade comprising:
(a) providing a plurality of strips according to claim 1;
(b) stacking the strips in a blade mould with other blade components, such that the upper or lower surface of each strip abuts the lower or upper surface of an adjacent strip in the stack to define an interface region between adjacent strips; and
(c) integrating the stacked strips and other blade components to form a blade by:
i) supplying resin to the stacked strips and other blade components;
ii) causing the resin to infiltrate into the interface regions between adjacent strips and other blade components; and
iii) curing the resin to bond the strips together.

39. A method of making a wind turbine blade comprising:
(a) providing a plurality of strips made by the method claim 28;
(b) stacking the strips in a blade mould with other blade components, such that the upper or lower surface of each strip abuts the lower or upper surface of an adjacent strip in the stack to define an interface region between adjacent strips; and (c) integrating the stacked strips and other blade components to form a blade by:
- (i) supplying resin to the stacked strips and other blade components;
- (ii) causing the resin to infiltrate into the interface regions between adjacent strips and other blade components; and
- (iii) curing the resin to bond the strips together.

40. A strip of fibre-reinforced polymeric material for a longitudinal reinforcing structure of a wind turbine blade, the strip having substantially flat upper and lower surfaces and extending longitudinally between first and second transverse edges, wherein an end region of the strip tapers in thickness towards the first transverse edge, and wherein one or more slots are defined in the tapered end region, the or each slot extending longitudinally from the first transverse edge of the strip into the tapered end region and terminating at a closed slot end spaced from the first transverse edge.

* * * * *